United States Patent [19]
Kojima et al.

[11] Patent Number: 5,887,913
[45] Date of Patent: Mar. 30, 1999

[54] PIPE JOINT STRUCTURE

[75] Inventors: Noriatsu Kojima; Yozo Kako, both of Nagoya, Japan

[73] Assignee: Noriatsu Kojima, Nagoya, Japan

[21] Appl. No.: 707,718

[22] Filed: Sep. 4, 1996

[30] Foreign Application Priority Data

Nov. 21, 1995 [JP] Japan ................................. 7-302976

[51] Int. Cl.⁶ .................................................. F16L 19/07
[52] U.S. Cl. ............................ 285/368; 285/85; 285/374; 285/353
[58] Field of Search ................................. 285/39, 42, 80, 285/85, 90, 56–60, 356, 360, 368, 374, 376, 403, 404, 91, 92

[56] References Cited

U.S. PATENT DOCUMENTS

| | | | |
|---|---|---|---|
| 846,704 | 3/1907 | Stucy | 285/90 X |
| 1,253,065 | 1/1918 | Looze | 285/85 |
| 1,869,915 | 8/1932 | Sample | 285/374 X |
| 1,911,659 | 5/1933 | Weaver | 285/360 X |
| 2,795,985 | 6/1957 | Wilson | 285/374 X |
| 3,159,302 | 12/1964 | Latham et al. | 285/374 X |
| 3,971,614 | 7/1976 | Paoli et al. | 285/85 X |
| 5,145,220 | 9/1992 | Burkholder | 285/374 |

*Primary Examiner*—Heather Shackelford
*Attorney, Agent, or Firm*—Nikaido Marmelstein Murray & Oram LLP

[57] ABSTRACT

In a housing formed in a drain pipe joint, a lock receiving portion on the near end face, an internal thread portion and a taper portion are formed. Also, in a screw ring, lugs are formed in six locations and a external thread is formed, both around the circumference of the screw ring, a flat face portion is formed perpendicular to the axial direction of the screw ring, and hexagonal sockets and internal threads are formed parallel to the axial direction of the screw ring. Then, the screw ring is secured on the drain pipe joint by fitting a tool such as a spanner to flat face portions formed in the lugs, or by fitting a hexagonal bar spanner or the like to the hexagonal sockets, so that the drain pipe and the drain pipe joint can be connected. Further, stopper screws are screwed onto the internal threads formed in the lugs, whereupon the tips of the stopper screws push the surface of the lock receiving portion formed in the drain pipe joint, securing the drain pipe joint and screw ring.

11 Claims, 20 Drawing Sheets

PIPE JOINT STRUCTURE

BACKGROUND OF THE INVENTION

1. Field of the Invention

The present invention relates to a pipe joint arrangement for a drainage pipe or the like, and further, it relates to a pipe joint structure connecting the pipe and the pipe joint of the drainage pipe or the like.

2. Description of the Prior Art

Conventionally, in drain pipes, connections between a vertical drain pipe and a horizontal branch drain pipe, as well as a vertical drain pipe and a horizontal main drain pipe, or between vertical drain pipes or horizontal branch drain pipes themselves, are performed via drain pipe joints, such connecting structures being connected, as in the drain pipe joint structure K2 shown in FIG. 1, by inserting a drain pipe 1 in a housing portion 23 having a flange portion 24 formed in a drain pipe joint 22, engaging a flexible packing 26 installed in the drain pipe 1 with a taper portion 25 formed in the inner periphery of the flange portion 24, and securing, by means of the flange portion 24 of the drain pipe joint 22 and three bolts, a locking flange 28 installed in the drain pipe 1 via a lock ring 27.

Also, in the case of drain pipe joint structure K3 shown in FIG. 4, an external thread 33 is formed in the outer periphery of a drain pipe joint 32, and the drain pipe 1 is inserted in the inner periphery of the drain pipe joint 32 by abutting it against a stop face 34 formed in the drain pipe joint 32. Also, a nut member 36 formed in the inner periphery by an internal thread 37 is arranged on the outer periphery of the drain pipe 1 via an O ring 35, and a band 39 is connected to the nut member 36 via a lug 38. Then, the lug 38 of the nut member 36 is rotated and the band tightened to thereby fix the drain pipe 1 and the drain pipe joint 22 together.

In the case of the drain pipe joint structure K4 shown in FIG. 5, a "slip on" type packing 44, mounted in the joint portion of a drain pipe joint of a heading collar pipe used in slab type collective housing (apartment buildings etc.) in particular for waste water, miscellaneous waste, etc. for example, is inserted in a pressure welded state within a joint portion 43 of a waste water pipe joint 42. Then, the drain pipe 1 is pressure weld-inserted into the slip on type packing 44 and the drain pipe 1 and drain pipe joint 42 are connected.

Further, in the case of another drain pipe joint structure, a flexible packing is mounted in a drain pipe at the end portion of which a collar for preventing a drain pipe from falling off is formed, and this is inserted into a drain pipe joint. The joint portion of the drain pipe joint has a housing portion formed therein and in the housing portion an internal thread portion and a taper portion to which the packing is engaged on the far side from the internal thread portion. A bushing on whose outer circumference a thread is formed engages with the internal thread portion formed in the housing portion of the drain pipe joint, compressing the packing. Also, a number of stopper nuts for locking the drain pipe into the bushing are arranged perpendicularly to the axial direction of the bushing.

However, in recent years in buildings for collective housing (apartments) etc., individual units are being utilized to the maximum limits of their areas. Along with this, not only has the horizontal space allowable for piping for drain pipes and the like installed to circulate residential waste water been reduced in size and the layout of piping for drainage inevitably reduced in size, but also, along with the advancing age of the population, low floor designs for preventing elderly people from stumbling are becoming common and slab heading collar piping in which the horizontal branch drain pipes are arranged extremely close on the concrete slab have become inevitable. Therefore, it has become necessary to consider many matters in pipe construction for drain piping.

For example, as shown in FIG. 2, where carrying out connected work on a drain pipe being installed between a corner of a wall C and another drain pipe, the work area is extremely narrow and when securing bolts and nuts, cases where the wall C and drain pipe interfere with the tools and they cannot be used and the work must take an extremely long time are common.

For instance, in the case of the drain pipe joint structure K2 shown in FIG. 1, since the flange portion 24 of the drain pipe joint 22 and the locking flange 28 are secured by bolts in three places, the positions of the bolts are determined at the time when the drain pipe joint 22 is installed. Since the positions of the bolts are normally separated by a third of the circumference of the flanges, any one of the bolts is located close to the wall or the other drain pipe. Consequently, the bolt cannot be tightened using a tool. Also, if the bolt is forcibly tightened, the joint is only partially secured, leaks occur between the packing 26 and the drain pipe 1 or flange portion 24, and each section is damaged. For this reason, if the piping is to be installed correctly without partial securing, it takes a very long time and work time is lost.

Also, in the case of the drain pipe joint structure K3 shown in FIG. 4, since the drain pipe 1 is connected to the drain pipe joint 32 by rotating the lug 38 of the nut member 36 installed on the outer periphery of the drain pipe 1, depending on the tightened condition of the nut member 36, when the lug 38 is positioned near a wall or on a concrete slab tools are interfered with and cannot be used.

In addition, as a horizontal drain pipe joint connecting a toilet drain pipe of a wall drainage P-type toilet used in particular in collective housing, in the case of a drain pipe joint structure K4 of a type wherein a "slip on" type packing 44 is installed in a joint portion 43 of a drain pipe joint 42 as shown in FIG. 5, the drain pipe joint 42 is normally arranged so that it is housed at the vertical drain pipe side of a curtain wall S disposed between the toilet and the vertical drain pipe. Also, the interior design work on the washroom is normally performed prior to installation of the toilet drain pipe and the toilet itself, the toilet drain pipe 1 passes through the curtain wall S and opens as a hole in alignment with the joint portion 43 of the drain pipe joint 42, and in this state interior decoration is carried out. Then, the toilet is installed after the toilet drain pipe 1 and the drain pipe joint 42 are connected and a sealing plate is attached to the hole portion Sa in the curtain wall and faced.

Therefore, when the toilet drain pipe 1 is connected to the drain pipe joint 42, the toilet drain pipe 1 must be inserted in a state where the joint portion 43 of the drain pipe joint 42 is difficult to inspect. Further, where the toilet drain pipe cannot reach its predetermined position and the contact area of the packing 44 is insufficient, leakage of contaminated air inside the drain water and drain pipe easily occurs and, in addition, as shown in FIG. 6, where the toilet drain pipe 1 is inserted at an angle, the packing 44 peels off from the joint portion of the drain pipe joint and there is the possibility of water leakage or odor leakage due to complex deformation being incurred, thus various types of methods are being examined in order to prevent this.

Also, in a drain pipe joint structure of a type in which a pipe loosening prevention collar is formed at the end of the drain pipe and a bushing provided with a stopper screw is used, because squeaking noises occur between the drain pipe and the stopper screw due to expansion and compression of the drain pipe, currently application of these types of structures is falling off.

SUMMARY OF THE INVENTION

An object of the present invention is to provide a pipe joint structure which not only solves the above-described problems, can readily connect the pipe joint arrangement of a drain pipe, drain pipe joint or the like even in narrow places with bad workability, eliminates the generation of squeaking noises, and does not readily incur pipe deficiencies such as partial locking or the like, but also does not loosen.

The pipe joint structure according to this invention, in order to solve the above problems, comprises a main pipe joint having at least one joint portion and an auxiliary pipe joint connectable to a pipe and the main pipe joint, with a housing portion formed in the joint portion, the housing portion having a lock receiving portion formed in an external end face of the housing portion, an internal thread portion formed in an inner circumference of the housing portion, and a taper portion formed at a far side from the internal thread portion, the auxiliary pipe joint having an external thread which screws into the internal thread portion of the main pipe joint, rotating means for rotating the auxiliary pipe joint, and locking means for locking the main pipe joint and the auxiliary pipe joint, and flexible packing installed in the auxiliary pipe joint has a tapering shape contactable with the taper portion and arranged at the far side of the internal thread portion in the housing.

Also, preferably, the lock receiving portion formed in the main pipe joint may also have an inclined face which inclines such that the height of the lock receiving portion increases toward a loosening direction with respect to a rotation direction of the auxiliary pipe joint.

Further, the inclined face may be plurally formed.

In addition, the lock receiving portion of the main pipe joint may also be formed in a flat surface shape.

Moreover, the rotating means of the auxiliary pipe joint is preferably characterized by comprising a plurality of protruding portions formed in a circumferential direction of the auxiliary pipe joint.

Further, the protruding portions may also comprise a flat face portion formed in a direction perpendicular to an axial direction of the auxiliary pipe joint, and a hexagonal socket portion formed in a direction parallel to the axial direction of the auxiliary pipe joint.

Further still, the locking means of the auxiliary pipe joint may be formed comprising the plurality of protruding portions formed in the circumferential direction of the auxiliary pipe joint, internal thread portions formed in the protruding portions in a direction parallel to the axial direction of the auxiliary pipe joint, and screw means for screwing into the internal thread portions, the end portion of the screw means being compressibly disposed in an inclined surface of the lock receiving portion formed in the main pipe joint.

For that reason, according to the present invention, where connecting a pipe to the main pipe joint, the main pipe is connected by securing the auxiliary pipe joint. Then, since protruding portions are formed in the auxiliary pipe joint, and these protruding portions have a flat face portion formed perpendicular to the axial direction of the auxiliary pipe joint and hexagonal socket portions formed parallel to the axial direction, the connecting work can be readily carried out and there is no occurrence of pipe deficiencies such as partial locking even when the pipe is installed in a narrow hard-to-get-at place, because any of the protruding portions of the auxiliary pipe joint need only be rotated. Further, since internal thread portions are formed in the protruding portions in a direction parallel to the axial direction, and an inclined face which inclines such that the height of the lock receiving portion increases toward a loosening direction with respect to a rotation direction of the auxiliary pipe joint is formed, if the stopper screw is screwed onto the internal thread and the inclined face pushed, locking of the main pipe joint and the auxiliary pipe joint is complete.

Also, another object of the pipe joint structure of the present invention is to eliminate squeaking noises due to the elongation and compression of prior art drain pipes, for which reason an internal thread portion formed in a direction parallel to the axial direction of the auxiliary pipe joint and a holding band, connected to the internal thread portion, for being able to grasp and secure the pipe, may be provided in each of the plurality of protruding portions formed in the circumferential direction of the auxiliary pipe joint.

Also, an internal thread portion formed in a direction parallel to the axial direction of the auxiliary pipe joint, a plurality of reinforced arms connected to the internal thread portion and disposed parallel to the axial direction of the auxiliary pipe joint, and support members connected to each of the reinforced arms and supported by a floor which passes through the pipe may be provided in each of the plurality of protruding portions formed in the circumferential direction of the auxiliary pipe joint.

Further, a pipe joint used in this pipe joint structure has a lock receiving portion in an external end face of a joint portion.

Further still, the lock receiving portion may have a sawtooth shaped inclined face and the inclined face may be formed protruding forward from a far side of the pipe joint.

Moreover, the sawtooth shaped inclined face may be formed facing the circumferential direction of the joint portion.

Lastly, an auxiliary pipe joint used in this pipe joint structure has an external thread portion which screws together with an internal thread portion of another pipe and a plurality of protruding portions formed in its outer circumference, and an internal thread portion is formed by being threaded into the protruding portion parallel to a pipe axis for screwing on a locking bolt.

Also, the auxiliary pipe joint may be separated into two parts, and an attachment portion formed on a joining surface of each of the half-shaped auxiliary pipe joints.

Consequently, the pipe joint of the present invention, in particular if used in pipe repair or refurbishing such as updating work, even work which has been difficult to execute for conventional pipe joint arrangements can be performed simply and accurately.

Further, this auxiliary pipe joint is provided on the outer peripheral surface thereof with an external thread portion engaging an internal thread portion formed on another pipe and a plurality of protruding portions such that each of the protruding portions has a planar portion in a direction normal to the axis of the pipe joint, an internal thread portion with which a locking bolt is screw-fitted is formed in parallel with to the axis of the pipe joint and on the side opposite to the external thread portion of each of the protruding portions, there is integrally formed a stepped portion including a smaller-diameter cylindrical portion and a larger-diameter cylindrical portion in that order from on the side of each of the protruding portions.

BRIEF DESCRIPTION OF THE DRAWINGS

These and other features, aspects and advantages of the present invention will become better understood with reference to the following description, appended claims and accompanying drawings.

DETAILED DESCRIPTION OF THE INVENTION

Herebelow, an embodiment of this invention will be explained based on the drawings. Note that although the pipe joint set forth in the present embodiment is described with regard to drain piping used for residential waste water in particular, the present invention is not limited to this, but may also be a pipe joint for various types of liquids such as water supply piping, hot water piping, pneumatic piping, air piping, etc.

Figure 1:
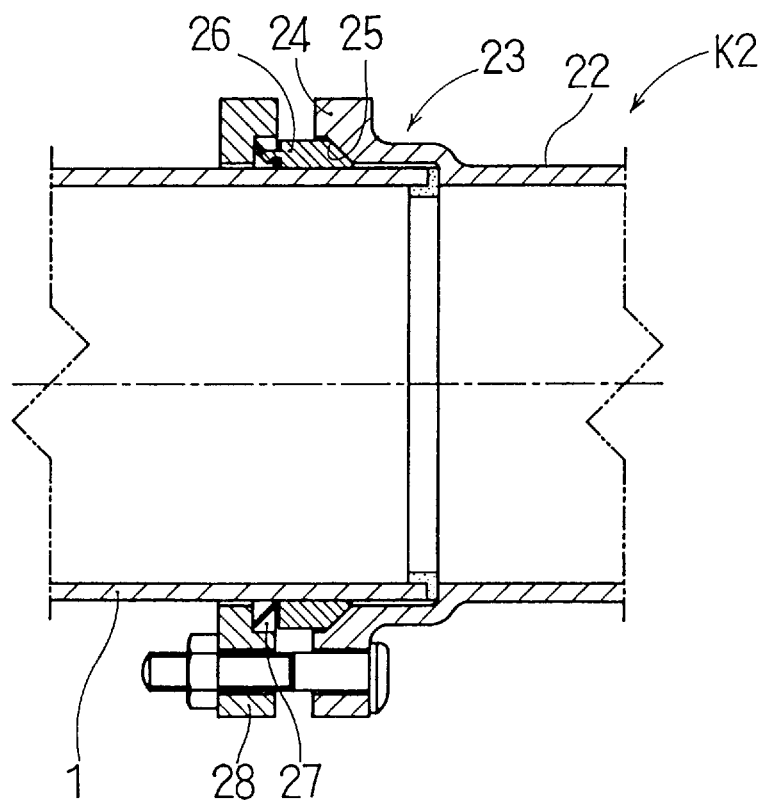
FIG. 1 is a view showing a conventional pipe joint arrangement structure.
Figure 2:
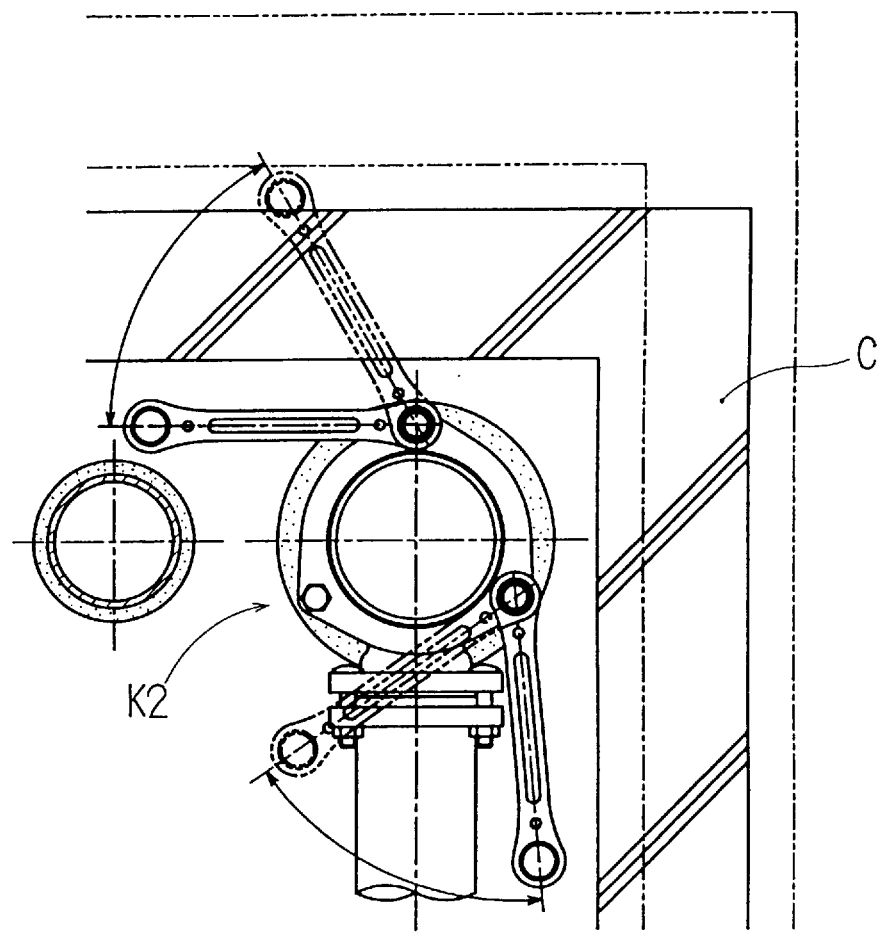
FIG. 2 is a drawing showing the usage conditions of the pipe joint arrangement structure of FIG. 1.
Figure 3:
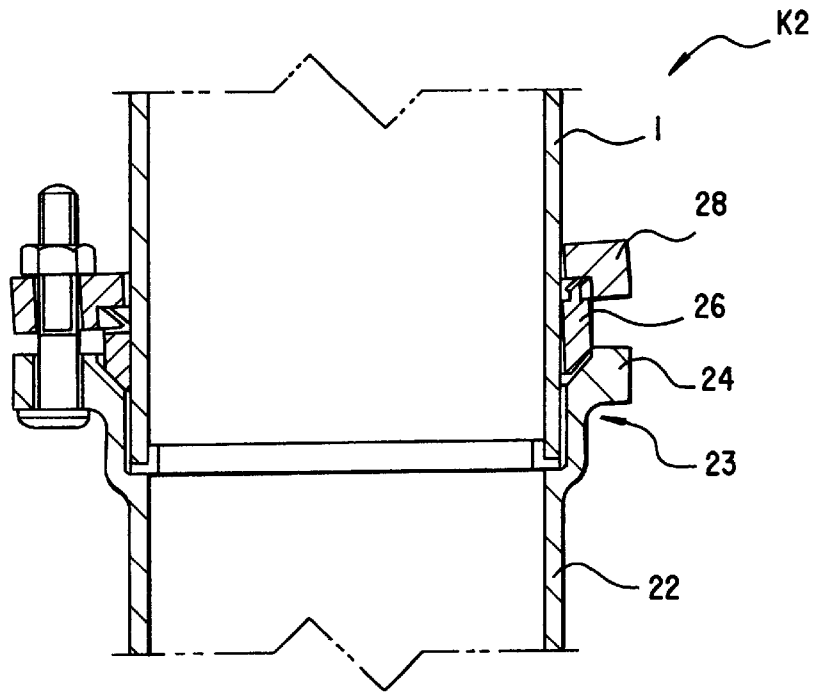
FIG. 3 is a drawing showing the problems of FIG. 1.
Figure 4:
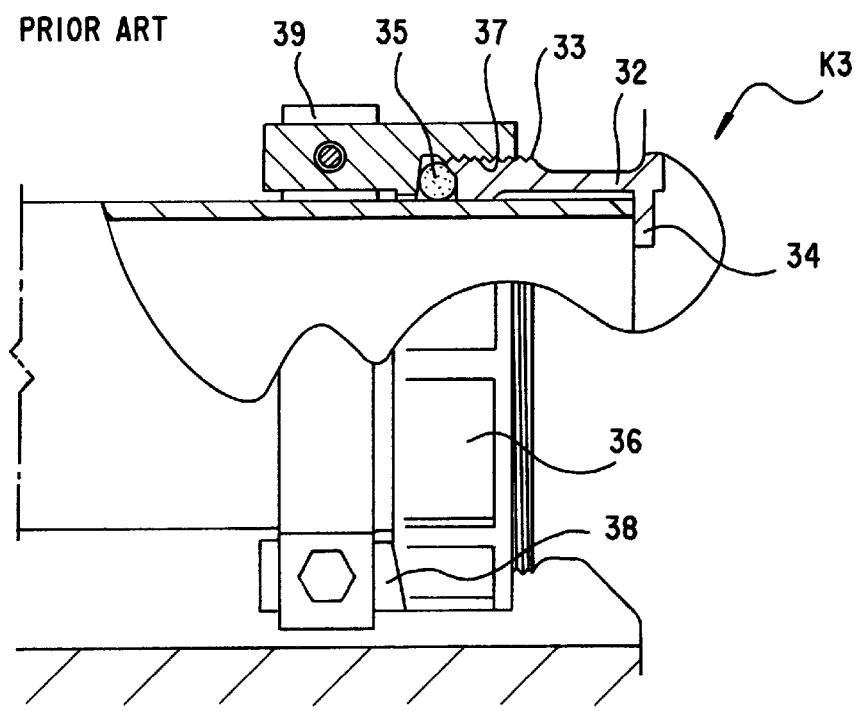
FIG. 4 is a view showing another conventional pipe joint arrangement structure.
Figure 5:
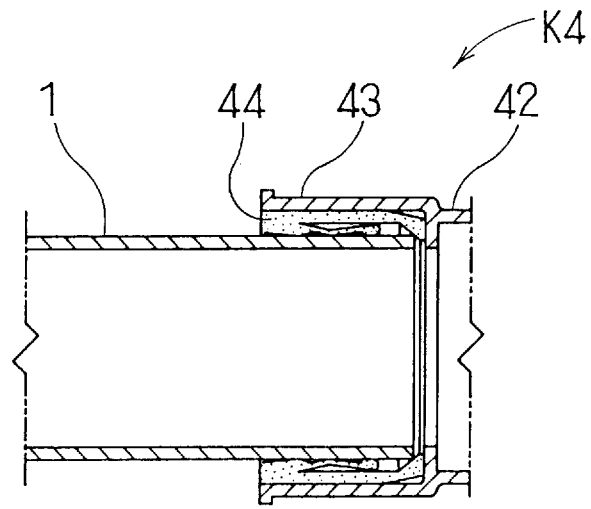
FIG. 5 is a view showing another conventional pipe joint arrangement structure.
Figure 6:
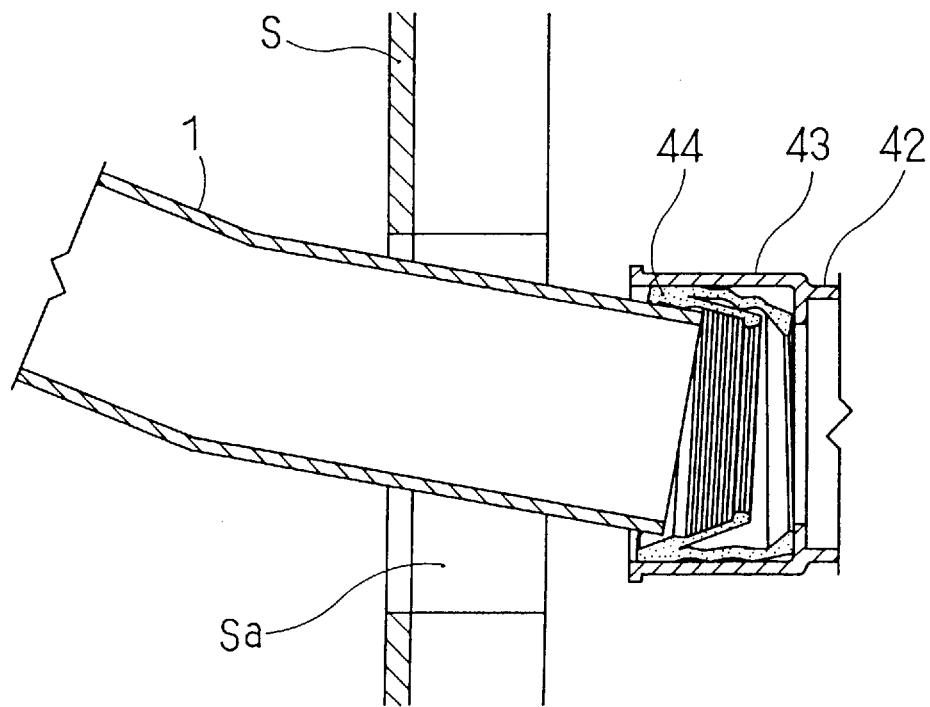
FIG. 6 is a drawing showing the problems of FIG. 5.
Figure 7:
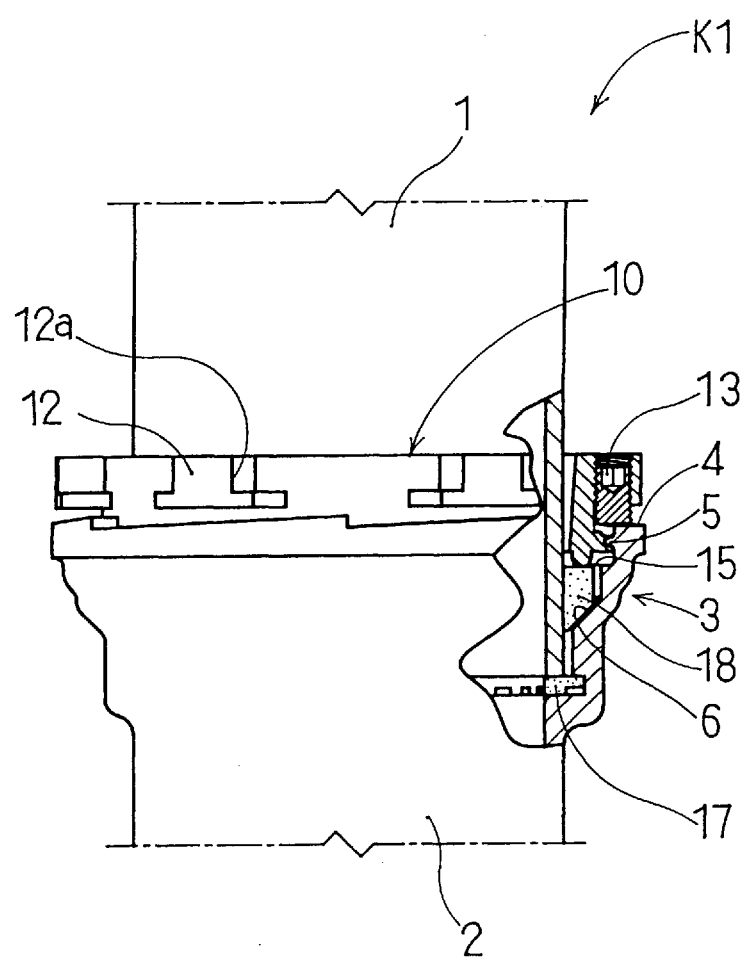
FIG. 7 is a pipe joint arrangement structure showing an embodiment according to the present invention.
Figure 8:
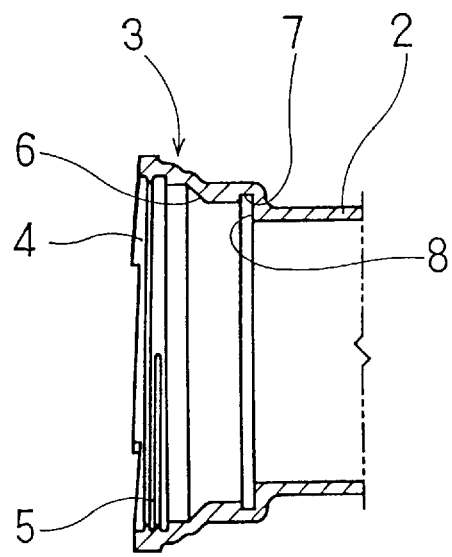
FIG. 8 is a cross sectional view of a main pipe joint in FIG. 7.
Figure 9:
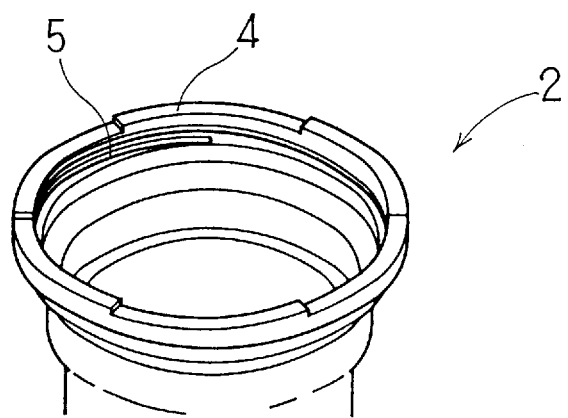
FIG. 9 is a perspective view of the main pipe joint in FIG. 7.

FIG. 7 shows a drain pipe joint structure Ki illustrating the first embodiment. A drain pipe 1 is connected by a drain pipe joint 2 serving as a main pipe joint and a screw ring 10 serving as an auxiliary drain pipe joint. The drain pipe joint 2, as shown in FIG. 8 and FIG. 9, has a housing portion 3 formed at the end portion thereof, and at the end face of the housing portion a lock receiving portion 4, which is separated into six sections each inclined upward toward a loosening direction with respect to the direction in which the screw ring 10 is rotated when seen from the front of the housing end face, is formed around the circumference of the drain pipe joint 2. (Note that in FIG. 8 the left side is the rear and the right side is the front.) Also, at internal thread 5 is formed in the inner circumference of the housing portion 3 and at the other side thereof a taper portion 6 is formed, and still further away, a groove 7 is formed and the rear face of this groove 7 is formed as a stopper face 8. In this case, the end face of a screw means arranged on a screw ring to be described later abuts the lock receiving portion 4 such that it is pushed into the inclined faces of the lock receiving portion 4.

The heights and lengths of the inclined faces of the lock receiving portion separated into six sections need not all be the same but may also be random.

Figure 10:
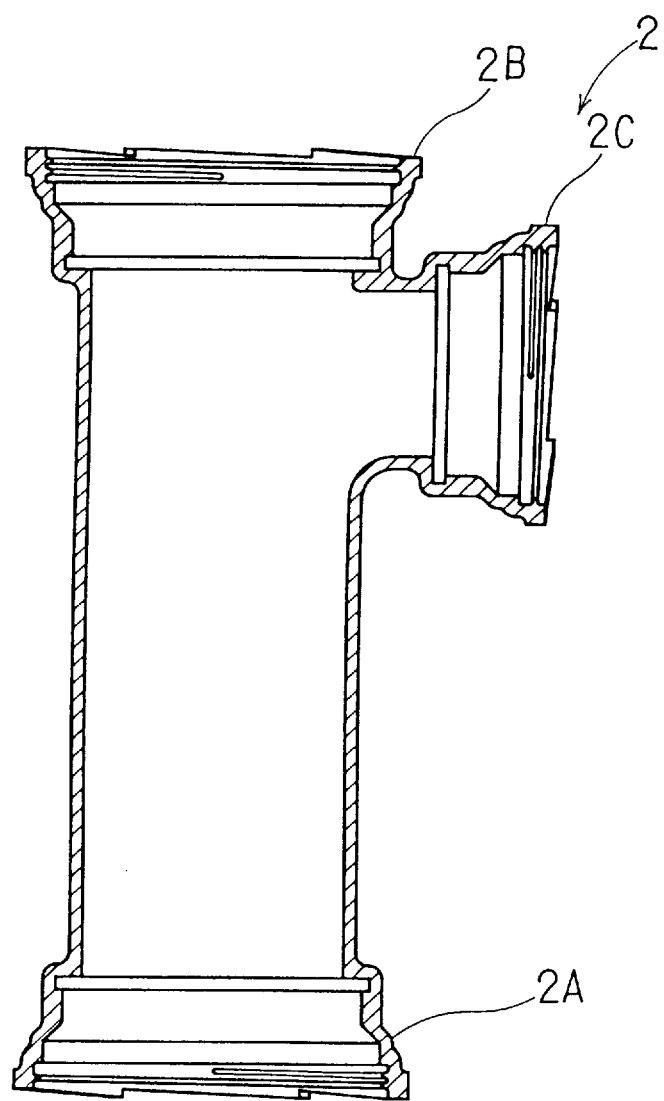
FIG. 10 is an overall view of an embodiment of the main pipe joint in FIG. 7.

Further, this drain pipe joint 2 may also be vertical drain pipe joint having joint portions 2A, 2B and 2C as shown in FIG. 10 or one formed in an elbow shape or socket shape, as long as at least one joint portion is formed.

The drain pipe joint 2 is formed from the housing portion 3 and a joint opening.

Figure 11A:
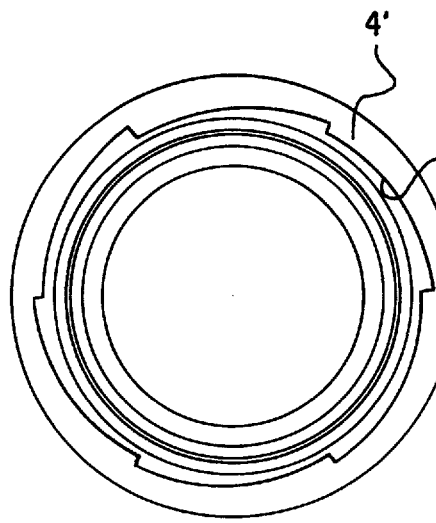
FIG. 11(a) and (b) are cross sectional views of another embodiment of the main pipe joint.
Figure 11B:
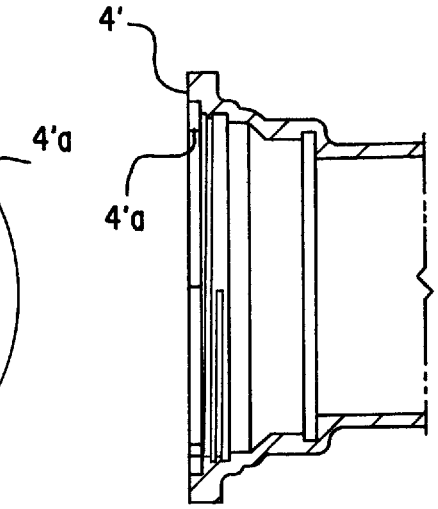

Also, the housing portion end face can be a flat shape as shown in FIGS. 11(a) and 11(b) or can be a lock receiving portion 4' formed in a sawtooth shape inclined so as to narrow the clockwise direction. In such a case, the screw arranged the screw ring to be described later abuts an inner circumferential side face 4'a of the lock receiving portion 4' the side face thereof.

Figure 12A:
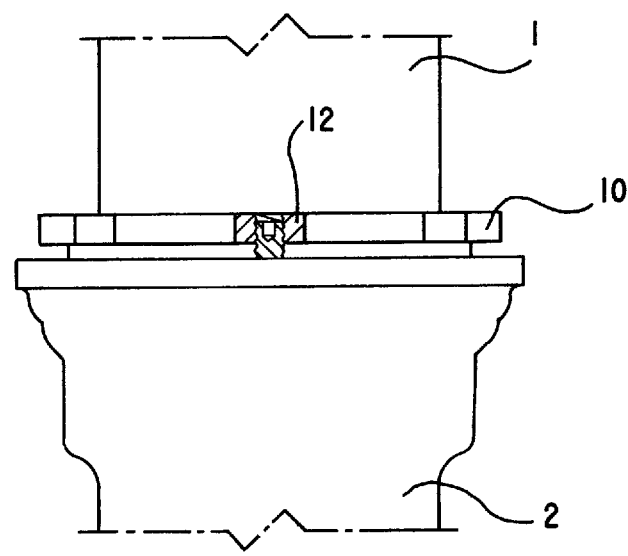
FIG. 12(a) and (b) are views showing another embodiment of the main pipe joint.
Figure 12B:
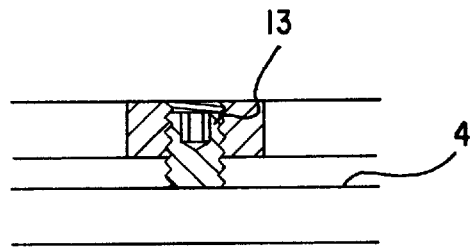

The lock receiving portion 4 is not formed in a sawtooth shape as shown in FIG. 9 or FIG. 11(a), but may simply be a flat portion formed perpendicular to the axis thereof as shown FIG. 12(a) and (b). In this case, the end of a screw 13 arranged on a screw ring 10 can lock by pushing down on the flat portion of the lock receiving portion 4. Naturally, forming it in a sawtooth shape as in FIG. 9 or FIG. 11(a) further improves its locking effect.

Figure 13A:
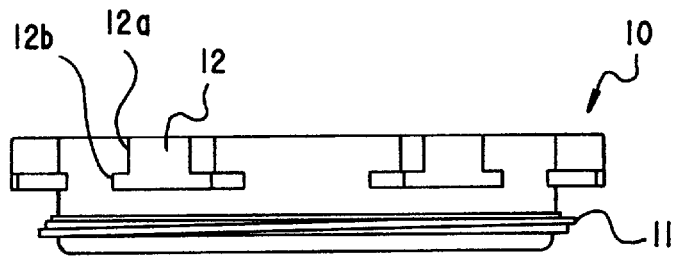
FIG. 13(a) and (b) are views showing an auxiliary pipe joint in FIG. 7.
Figure 13B:
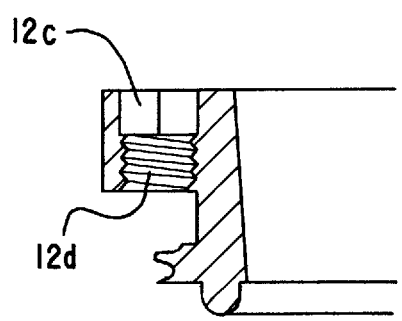
Figure 14:
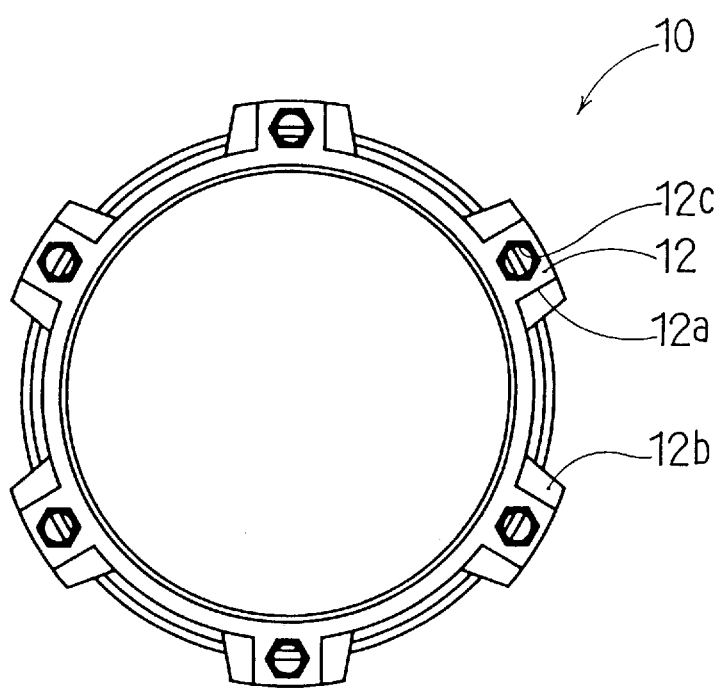
FIG. 14 is a plan view of the auxiliary pipe joint in FIG. 13.

The screw ring 10 is formed in a circular shape as shown in FIGS. 13 and 14, an external thread 11 is formed in the outer circumference thereof, and lugs 12 are formed in 6 protruding shapes separated in the circumferential direction and protruding radially. Flat portions 12a are formed in the lugs 12 peripendicular to the axial direction so that a tool such as a spanner or the like can be fitted thereto, and seats 12b are formed in the lower portions of the flat portions 12a for supporting a tool such as a spanner or the like. Further, hexagonal holes 12c are formed from the upper end faces of the lugs 12 parallel to the axial directions thereof to half the depth of the lugs 12, and at the far sides of the hexagonal holes 12c internal threads 12d are formed penetrating through the lugs 12. Also, stopper screws 13 with hexagonal holes are engaged with the internal threads 12d.

Although the lugs 12 in the present embodiment are formed in 6 places protruding radially they are not limited to this, and may be any shape so long as they are formed in a number of locations. Further, the lugs 12 need not be arranged at equivalent intervals but may also be arranged in random states. Also, it is not necessary for the shapes of the lugs 12 to be substantially square but merely that they are able to be fitted by a tool such as a spanner.

Also, the internal thread 5 formed in the drain pipe joint 2 or the external thread 11 formed in the screw ring 10 may have a part of a bar of any type of screw formed in a notch portion, and may be a machine processed or a cast structure. Additionally, a molded screw is also permissible so long as it is a resin product such as vinyl chloride or the like.

Figure 23:
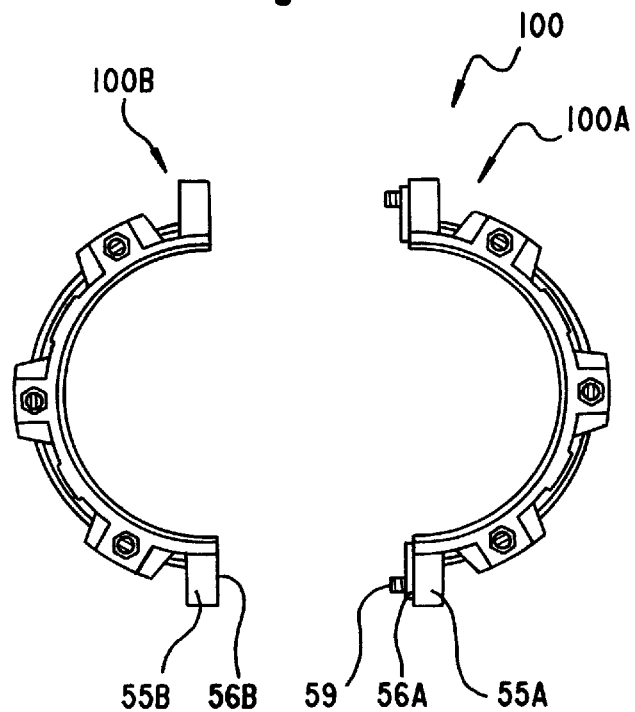
FIG. 23 is a two-part drawing showing yet another embodiment of the auxiliary pipe joint.
Figure 24:
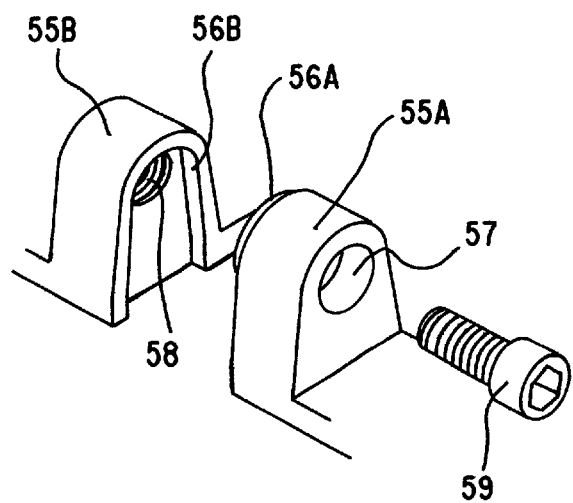
FIG. 24 is a detailed drawing of part of FIG. 23.

Further, the screw ring 10, as shown in FIGS. 23 and 24, may be separated into two semicircular shapes connected and integrated by bolts or the like. According to this embodiment the screw ring 100 is separated into a half screw ring 100A and half screw ring 100B, lugs 55A are formed at both end portions of one half screw ring 100A having protruding portions 56A on surface connecting with the other half screwing 100B, and lugs 55B are formed at both end portions of theother half screw ring 100B having indented portions 56B which engage with the protruding portions 56A of the half screw ring 100A. The lugs 55A each have a stepped hole into which a bolt 59 is inserted, and an internal thread 58 into which a bolt is screwed is formed in each of the lugs 55B. Then, the half screw ring 100A and the half screw ring 100B are engaged and the screw ring 100 is formed by tightening the bolt 59. This screw ring 100 is extremely effective in detaching the screw ring when the drain pipe joint 1 and the drain pipe 1 are in a connected state.

Where the drain pipe 1 is connected to the drain pipe joint 2 formed in this way via the screw ring 10, firstly the screw ring 10, a slip washer 15 and flexible packing 18 are inserted in order through the drain pipe 1 from the end portion of the drain pipe 1 at the connected side. Then, the drain pipe 1 through which the screw ring 10, a slip washer 15 and flexible packing 18 are inserted is inserted into the drain pipe joint 2 in which elastic absorbent packing 17 is mounted in a groove 7 previously formed in the drain pipe joint 2 until the drain pipe 1 abuts the elastic absorbent packing 17. Then, the screw ring 10 is rotated clockwise and secured so that the external thread 11 formed in the screw ring 10 engages with the external thread 5 formed in the drain pipe joint 2. By securing the screw ring 10, the flexible packing 18 having a taper portion formed at the end thereof is engaged in a state where the taper portion is pressure welded to the taper portion 6 formed inside the housing 3 of the drain pipe joint 2.

Figure 18:
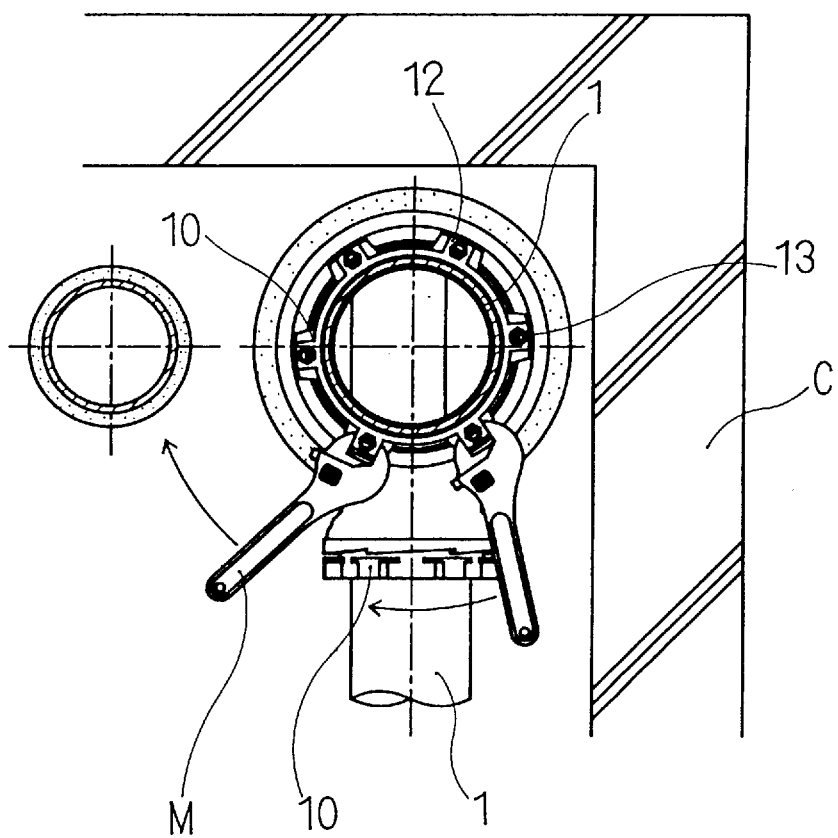
FIG. 18 is a drawing showing the usage conditions of the pipe joint arrangement structure of FIG. 7.

At this time, the means by which the screw ring is rotated may be performed by either attaching a monkey wrench M as shown in FIG. 18 to the flat portions 12a formed in both sides of the lug 12 formed in the screw ring 10 and rotating or inserting a hexagonal bar spanner L in the hexagonal hole 12c formed in the lug 12 and rotating, with the drain pipe in an attached state.

With this pipe joint structure KI, since the packing 18 is cured so that it is not directly exposed to the outside, it has a physical deterioration prevention effect.

Also, by securing the stopper screw 13 with hexagonal hole and engaged with the internal thread 12d formed in the lug 12 of the screw ring 10, and compressing the inclined face of the lock receiving portion 4 formed in the drain pipe joint 2, the drain pipe joint 2 and the screw ring 10 are locked. This is because, since the lock receiving portion 4 has an inclined face which is inclined upward in the loosening direction of the screwing 10 with respect to the rotation direction of the screwing 10, the screw ring 10 cannot turn in the loosening direction in a state where the stopper screw 13 having a hexagonal hole and attached to the screw ring 10 is secured in the lock receiving portion 4.

Figure 15A:
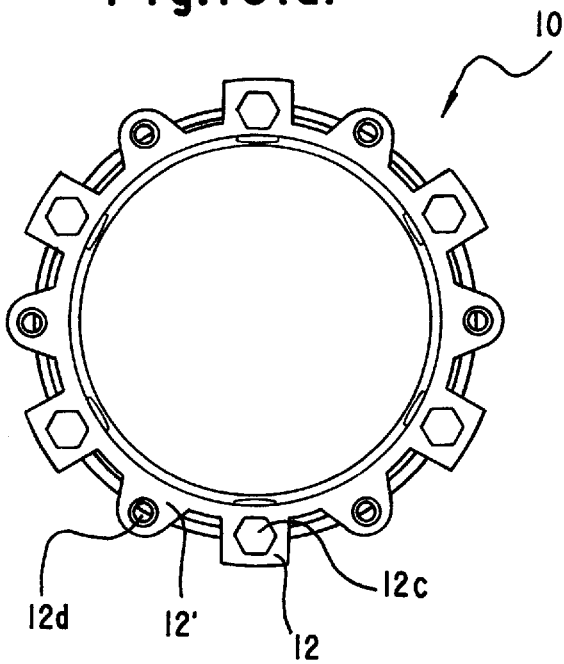
FIG. 15(a) and (b) are plan views of another embodiment of the auxiliary pipe joint in FIG. 7.
Figure 15B:
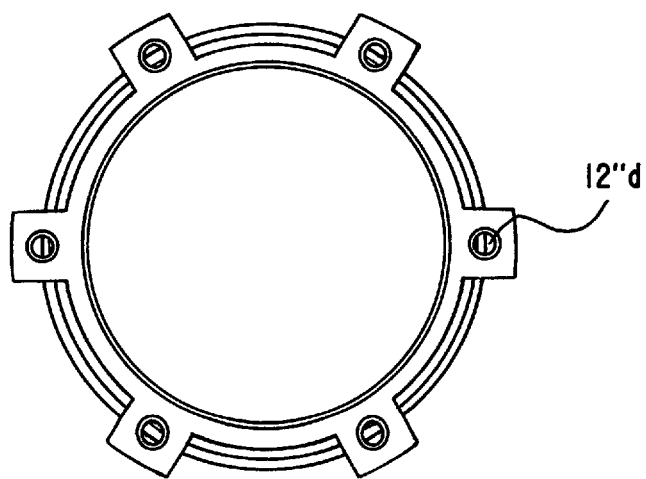

In the present embodiment, although the hexagonal hole 12c and internal thread 12d formed in the lug 12 of the screw ring 10 are formed in one lug 12, as shown in FIG. 15(a) a lug 12 and another protruding portion 12' may be formed and the hexagonal hole 12c formed in the lug 12 while the internal thread 12d is formed in the protruding portion 12', or as shown in FIG. 15(b) an internal thread 12'd may be formed parallel with the axial direction of the screw ring 10 in each of six separate lugs 12. In this case, the seats 12b shown in FIG. 14 may or may not be formed.

Figure 16:
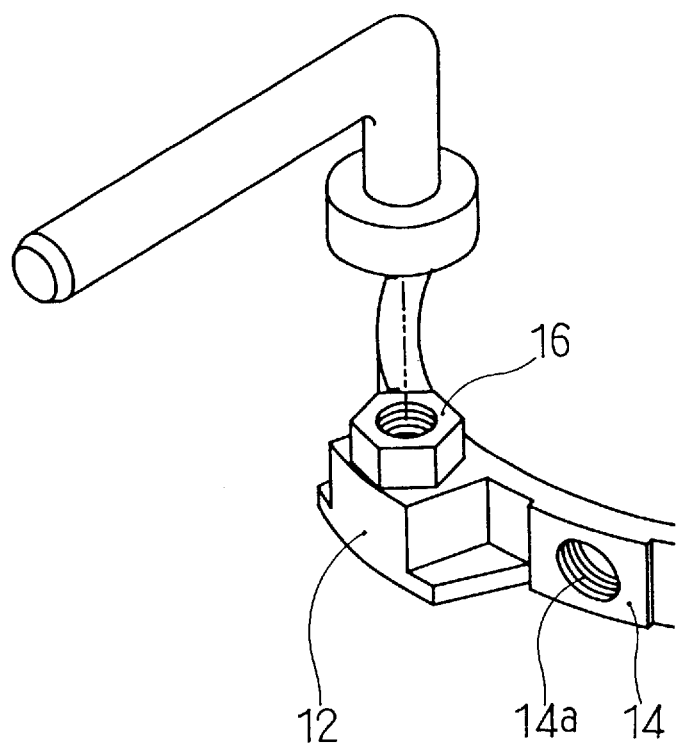
FIG. 16 is a perspective view of another embodiment of the auxiliary pipe joint in FIG. 7.
Figure 17:
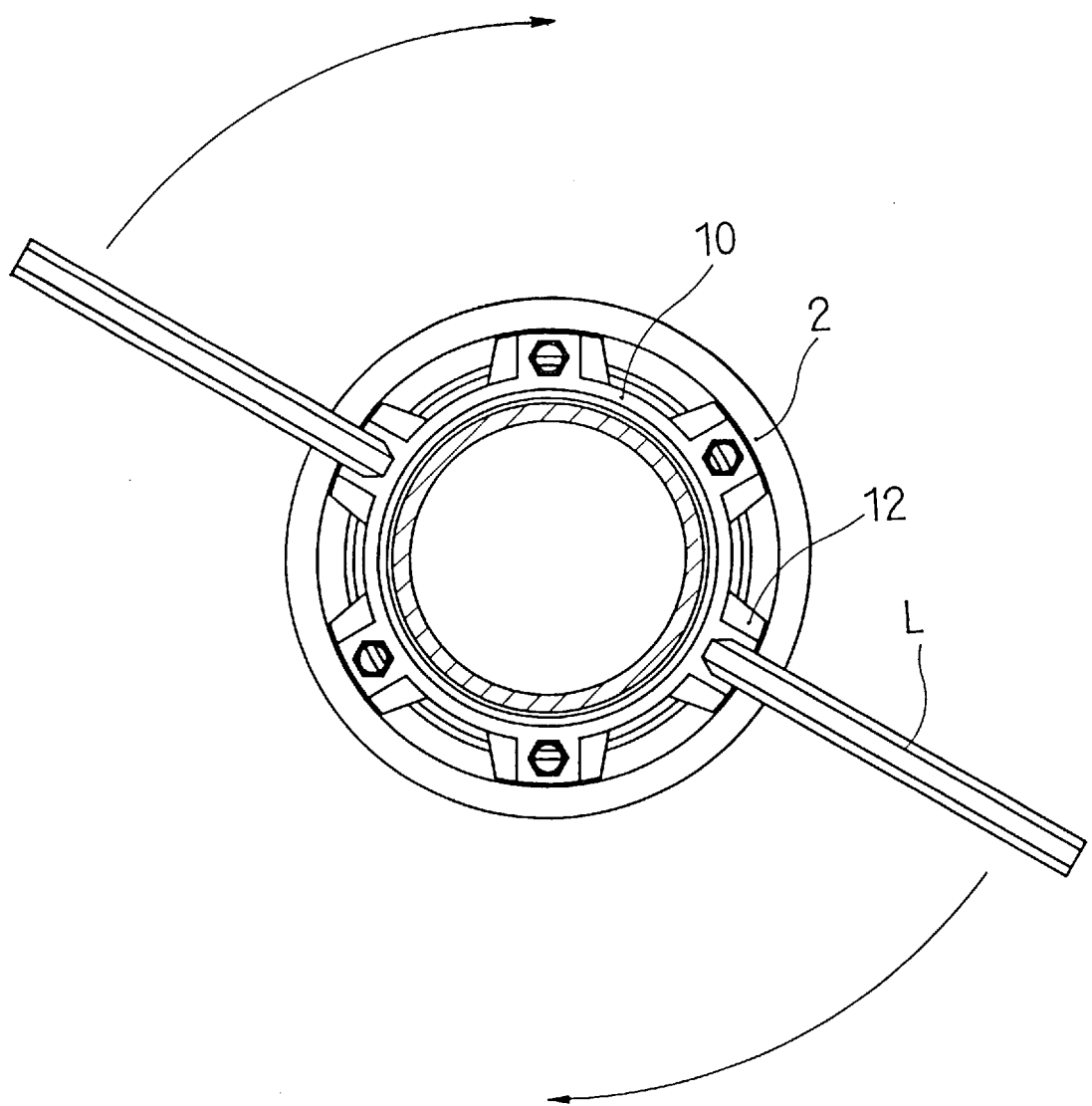
FIG. 17 is a drawing showing the operating method of the pipe joint arrangement of FIG. 7.

Also, as shown in FIG. 16, a hexagonal protruding portion 16 can be integrally formed on the lug 12 and a hexagonal hole spanner or the like fitted to the hexagonal protruding portion 16 to rotate the screw ring 10. Further, the stopper screw can be locked to the drain pipe 1 by forming boss portions 14 in the circumferential direction of the screw ring 10 between each of the lugs 12, forming internal threads 14a perpendicular to the axial direction of the screw ring 10, and screwing a stopper screw made of a light resin for example which does not easily generate a squeaking noise into each of the internal threads 14a.

Next, a state where the drain pipe joint 2 and screw ring 10 according to the present embodiment are actually used in drain pipe attachment work will be explained.

FIG. 18 illustrates a case where either new drain pipe attachment work or replacement work is being carried out in a state where the drain pipe 1 is located near a corner of a wall C and is between the corner and another drain pipe. In this case, the drain pipe joint is connected to a lower vertical drain pipe and an upper vertical drain pipe and horizontal branch drain pipe are connected.

A joint portion 2A of the drain pipe joint 2 is connected to the vertical drain pipe 1 installed from underneath the floor via the screw ring 10 as shown in FIG. 10, and the vertical drain pipe is connected to a joint opening 2B and the horizontal branch drain pipe to a joint portion 2C via screw rings 10. The lugs 12 of the screw rings 10 are formed in six places at 60° so that they can rotate 360°, therefore the screw ring 10 can be tightened as much as possible by rotating it using any one of the lugs 12 to which a monkey wrench can be fitted, then fitting the monkey wrench to the next lug 12 to tighten it. Further, because the stopper screw 13 for locking is attached parallel to the axis of the pipe, it can be tightened from any position.

In this way each drain pipe 1 can be connected to one of joint portions 2A, 2B and 2C by tightening the screw ring 10. Also, because the central screw ring 10 is tightened without turning the drain pipe joint 2 or the drainpipe 1 itself, the operation can be easily carried out. Further, since the drain pipe is accurately connected without the occurrence of partial locking, there is no leakage from the packing and damage to the various components.

Figure 19:
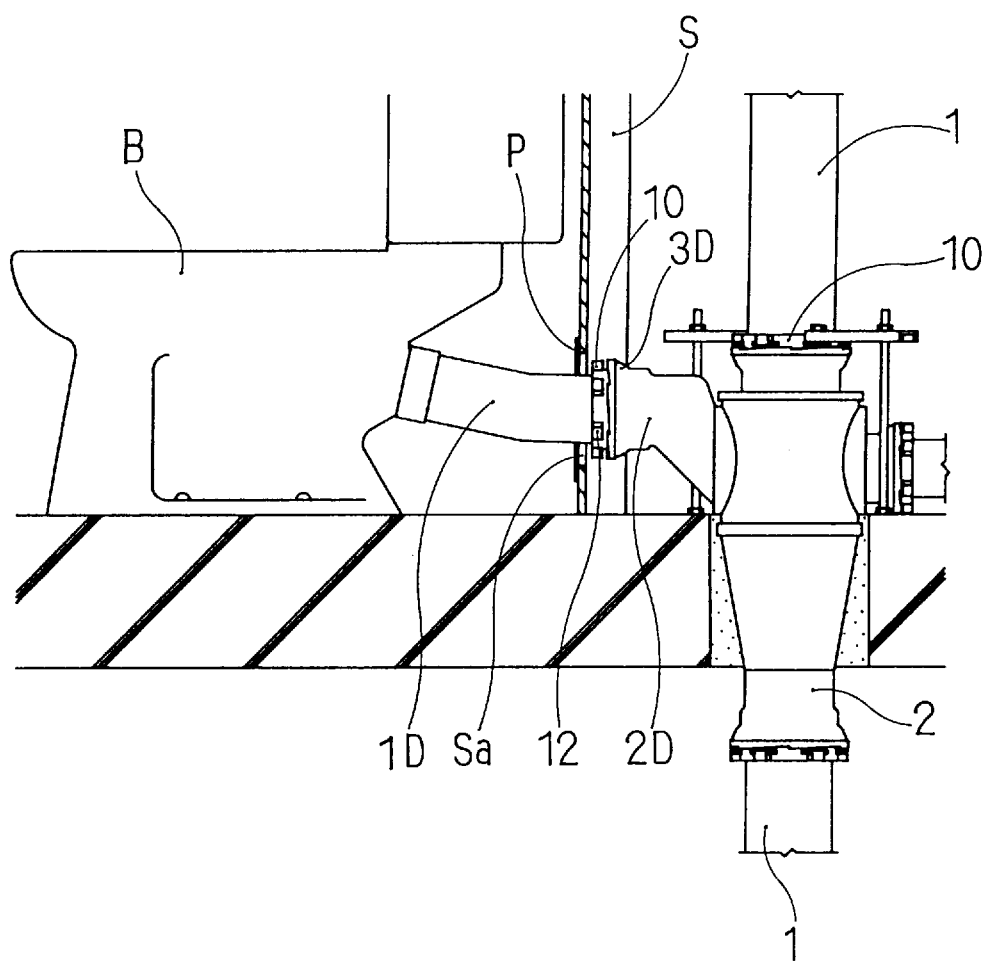
FIG. 19 is a drawing showing the usage conditions of the pipe joint arrangement structure of FIG. 7.

FIG. 19 shows a state where the present embodiment is used for a drain pipe extending from a toilet, and the operation employed therein will be explained in sequence.

The vertical drain pipe 1 and drain pipe joint 2 are arranged opposite each other between the washroom and a curtain wall S and a joint portion 2D of the drain pipe joint 2 connected to the toilet drain pipe 1D is arranged near the curtain wall S. The toilet B to be installed in the washroom and the toilet drain pipe 1D are not installed in predetermined positions until the interior decoration of the washroom is complete.

Also, a hole Sa through which the toilet drain pipe is to be passed is opened in the curtain wall S, the toilet drain pipe 1D is inserted toward a housing portion 3D of the joint ion 2D of the drain pipe joint disposed in a predetermined position, and the screw ring is tightened. Since the screw 10 is inserted into the curtain wall, tightening of the screw ring can be carried out by fitting a hexagonal bar spanner into the hexagonal hole 12a of the lug 12 and turning it. If the screw ring is tightened, the toilet drain pipe 1D is accurately fitted to the joint portion 2D of the drain pipe joint 2 and there is no partial locking.

Thereafter, the toilet is connected to the toilet drain pipe 1D and installed in a predetermined position. Then a ring plate P is attached to the hole Sa in the curtain wall and the inside of the washroom is finished.

Figure 20A:
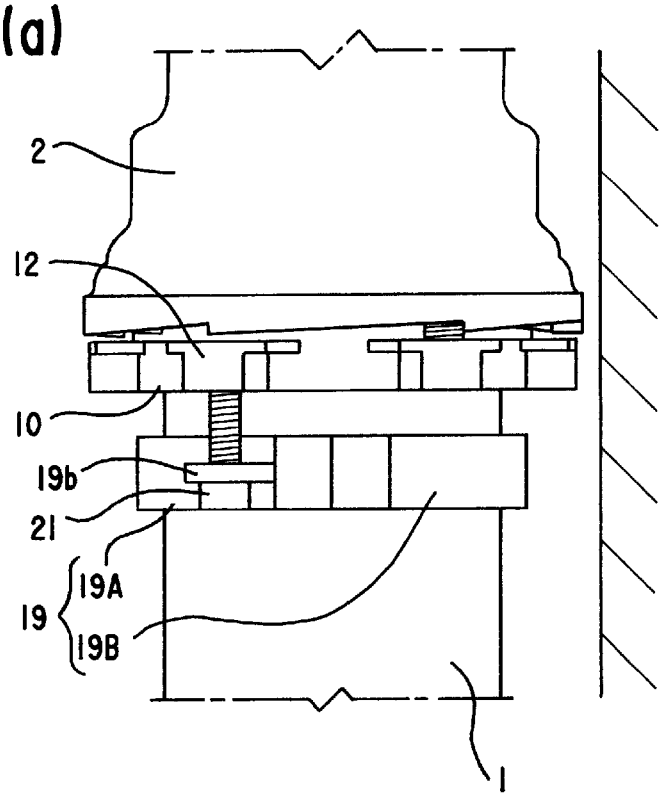
FIG. 20(a) and (b) are pipe joints arrangement structure showing another embodiment according to the present invention.
Figure 20B:
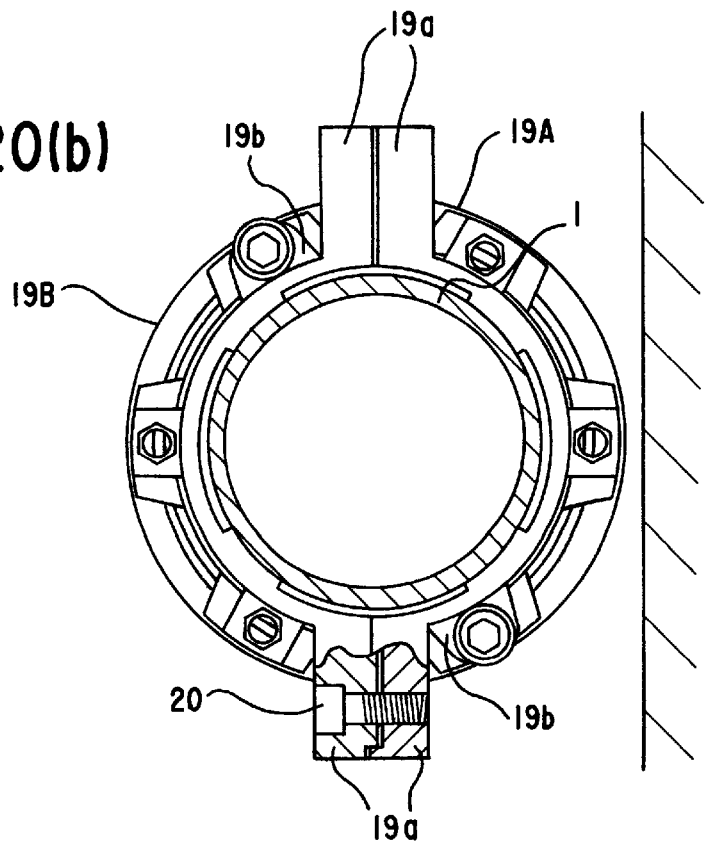

FIG. 20 shows another usage state of the screw ring according to the present embodiment, and in particular shows a usage state in which it is used as a means which is normally necessary for preventing the drain pipe from disconnecting in the case of liquid force feed piping.

Two separate bands 19A and 19B having lug portions 19a in both sides are connected together by bolts 20 to form an integrated holding band 19.

Attachment leg portions 19b having substantially the same pipe as the lugs 12 of the screw ring 10 are formed in one location each in the bands 19A and 19B perpendicular thereto, bolts 21 are inserted into the attachment leg portions 19b, and the bolts 21 are screwed into internal threads 12d (refer to FIG. 13) formed in each of the lugs of the screw ring 10.

In this case, firstly, the drain pipe 1 is inserted into the drain pipe joint 2, then after the screw ring 10 is tightened, the separated bands 19A and 19B are attached to the drain pipe in positions where the bolts 21 are easy to tighten and are further tightened by tightening the bolts 20, and after the bolts 21 are connected to the screw ring 10, the drain pipe 1 is fixed in place by completely tightening the bolts 20.

Figure 21:
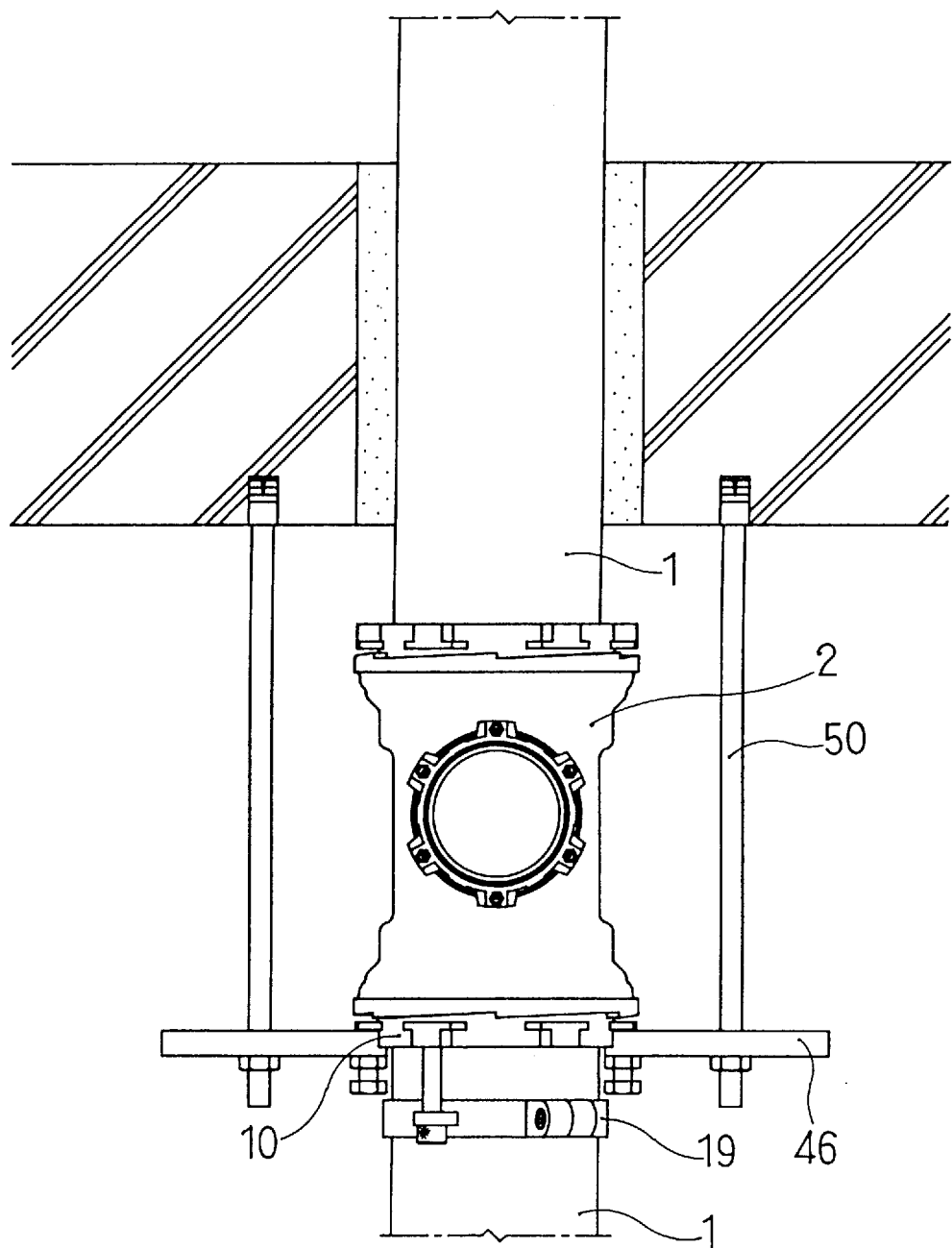
FIG. 21 is a pipe joint arrangement structure showing another embodiment according to the present invention.
Figure 22:
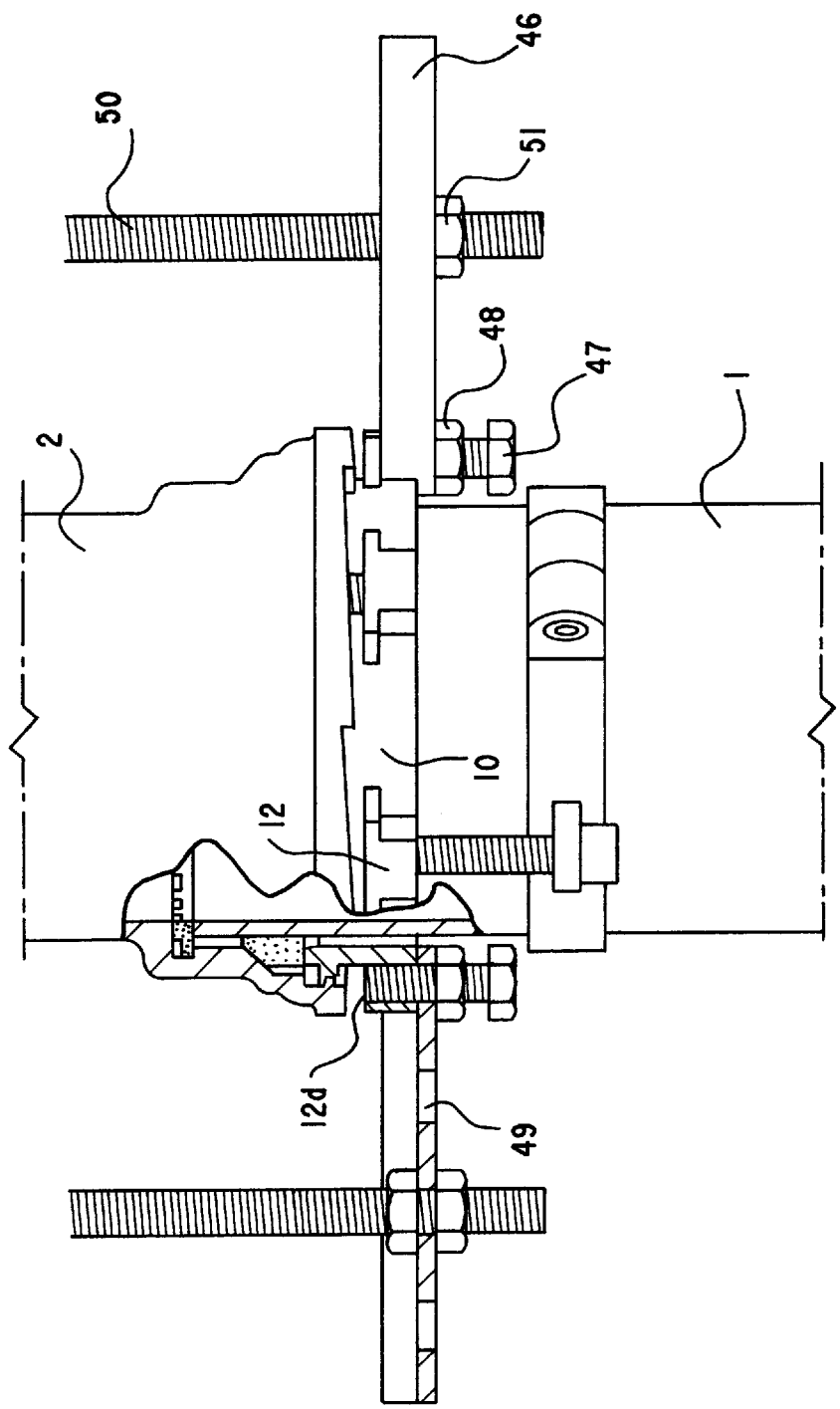
FIG. 22 is a detailed view of FIG. 21.

Also, in the pipe joint structure K1 of the present invention the drain pipe joint can be underslung by using internal threads 12d which are not being used among the internal threads 12d of the lugs 12 used for locking, as shown in FIGS. 21 and 22.

In this case, upon directly attaching the bands to the vertical drain pipe and underslinging the vertical drain pipe joint and the vertical drain pipe and drain pipe joint, generation of squeaking noise due to the elasticity of the vertical drain pipe and the drain pipe joint can be countered.

In the state where the drain pipe 1 and the drain pipe joint 2 are connected, reinforcing arms 46 whose cross sections form grooves are attached to the internal threads 12d not used by the lugs 12 of the screw ring 10 at either two locations at opposite sides or three locations separated by 120° and are fixed by bolts 47 and nuts 48. Then, long hanging bolts 50 which serve as adjustable support members fixed to the concrete slab are inserted through a plurality of holes 49 formed in the reinforcing arms 46, and are fixed by nuts 51.

Also, the bolts 47 fixing the reinforcing arms 46 may also be used in common in place of the stopper screws 13 with hexagonal holes for locking the drain pipe joint 2 and the screw ring 10.

In this underslinging method, because the reinforcing arms 46 are attached to the screw ring 10, the drain pipe 1 and drain pipe joint 2 can be accurately underslung without being affected by expansion and compression.

Figure 25:
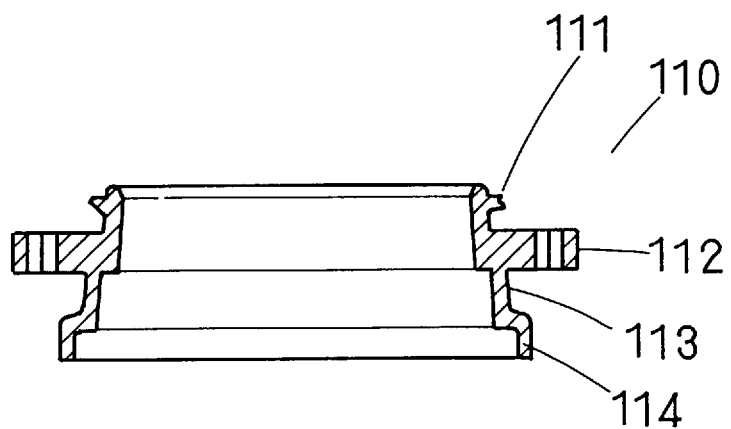
FIG. 25 is a detailed illustration of part of FIG. 24.
Figure 26:
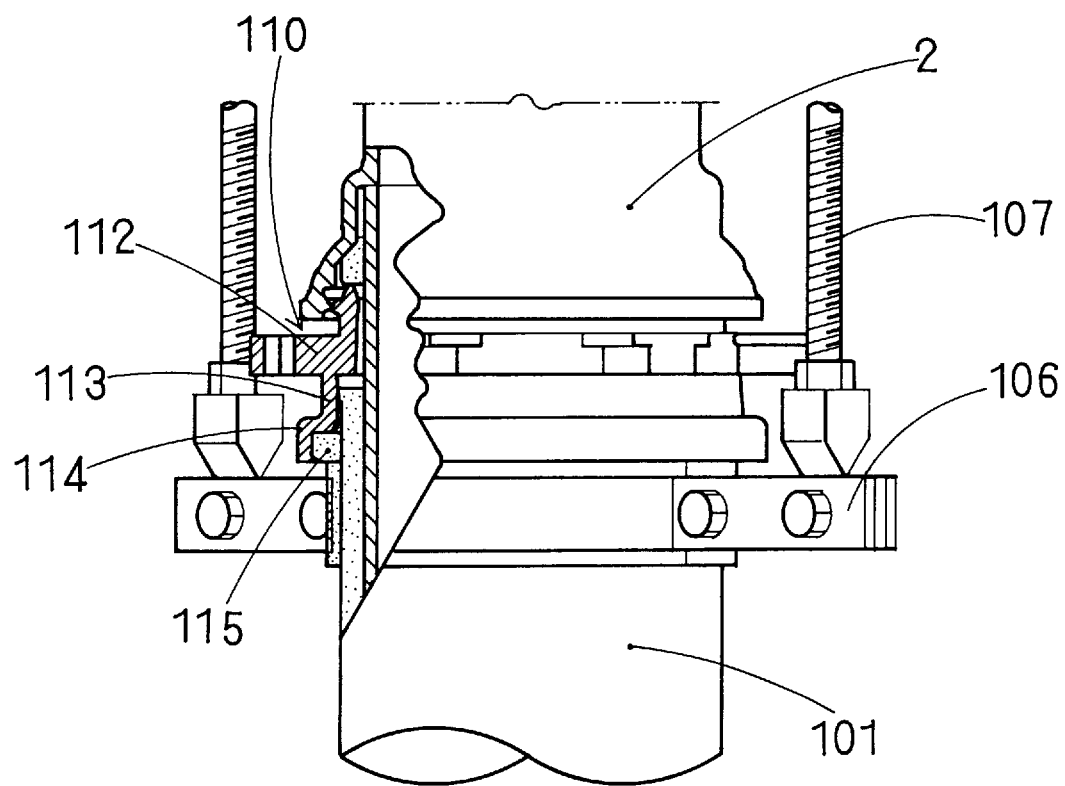
FIG. 26 is an illustration of a piping state when the auxiliary pipe joint shown in FIG. 25 is used.

Further, FIGS. 25 and 26 show a screw ring 110 suitable for a case where a fireproofing double-layer pipe 101 is used as a drain pipe and a manner in which the pipe 101 is used. In contrast to the structure of the above-described screw ring 10, the screw ring 110 is additionally provided with a cylindrical portion on the side opposite to the external thread 11 of the lug 12.

The screw ring 110 is in the form of a circular ring and is provided with six protruding lugs 112 separated from one another in the circumferential direction at the central portion thereof. Further, on the outer periphery of the screw ring 10 there is formed an external thread 111 on one side of the axis of each of the lugs 112 and on the other side thereof there are formed a cylindrical portion 113 of a smaller diameter and a cylindrical portion 114 of a larger diameter both of which are formed in two steps. The cylindrical portion 113 is formed to fit on the outer peripheral surface of the fireproofing double layer while the cylindrical portion 114 is formed to cover a joint 115 to fill the gap at the outer peripheral portion of the fireproofing double layer pipe.

The external thread 111 is screw-fitted with the drain pipe joint 2 and each of the lugs 112 is so formed as to allow a tool such as a spanner or a hexagon spanner to be fitted therein, as in the case of the above-described screw ring 10. therein, in FIG. 26, on the outer peripheral surface of the fireproofing double layer pipe 101 there is arranged a half-split holding band 106 with which an elongated suspension bolt 107 is screw-fitted so as to suspend the drain pipe joint 2.

What is claimed is:

1. A pipe joint structure, comprising
   a main pipe joint having a front end and a rear end defining a housing portion and a lock receiving portion,
   wherein the housing portion has, in an inner periphery thereof, an internal thread and a taper portion which is located adjacent the internal thread toward the front end of the main pipe joint;
   a pipe connected to the main pipe joint via the housing portion;
   a radial auxiliary pipe joint, connectable to the pipe and the main pipe joint, having
     an external thread which is screwed in a locking direction into the internal thread of the housing portion,
     a plurality of protrusions which protrude radially from the auxiliary pipe joint, wherein each of the plurality of protrusions has a pair of planar portions which are formed perpendicular to a center axis of the auxiliary pipe joint on opposite sides of each of the plurality of protrusions, and hexagonal holes are formed in each of the plurality of protrusions parallel to the center axis of the auxiliary pipe joint, and
     locking means for locking the main pipe joint and the auxiliary pipe joint via the lock receiving portion; and
   a flexible packing, located between the taper portion and the pipe, which forms a seal between the pipe and the main pipe joint.

2. The pipe joint structure of claim 1, wherein the lock receiving portion comprises an inclined face which inclines toward the locking direction.

3. The pipe joint structure of claim 1, wherein the lock receiving portion comprises a plurality of inclining members.

4. The pipe joint structure of claim 1, wherein the lock receiving portion is formed in an external end face of the rear end.

5. The pipe joint structure of claim 1, wherein each of the plurality of protrusions defines an internally threaded bore therein which is parallel to the center axis of the auxiliary pipe joint, and the locking means comprises at least one screw which is screwed into the internally threaded bore and contacts the lock receiving portion to attach the lock receiving portion and the auxiliary pipe joint.

6. A pipe joint structure, comprising
   a main pipe joint having a front end and a rear end defining a housing portion and a lock receiving portion,
   wherein the housing portion has, in an inner periphery thereof, an internal thread and a taper portion which is located adjacent the internal thread toward the front end of the main pipe joint;
   a pipe connected to the main pipe joint via the housing portion;
   a radial auxiliary pipe joint, connectable to the pipe and the main pipe joint, having
      an external thread which is screwed in a locking direction into the internal thread of the housing portion,
      a plurality of protrusions which protrude radially from the auxiliary pipe joint, wherein each of the plurality of protrusions has a pair of planar portions which are formed perpendicular to a center axis of the auxiliary pipe joint on opposite sides of each of the plurality of protrusions, and hexagonal holes are formed in each of the plurality of protrusions parallel to the center axis of the auxiliary pipe joint, and
      locking means for locking the main pipe joint and the auxiliary pipe joint via the lock receiving portion; and
   a flexible packing, located between the taper portion and the pipe, which forms a seal between the pipe and the main pipe joint,
   wherein the plurality of protrusions each define internally threaded bores therein which are parallel to the center axis of the auxiliary pipe joint, and the pipe joint structure further comprises a holding band which is attached to the pipe, the holding band comprising a plurality of attachment leg portions, wherein the holding band is attached to the auxiliary pipe joint via screws which are inserted into the plurality of attachment leg portions and are screwed into the internally threaded bores.

7. A pipe joint structure, comprising
   a main pipe joint having a front end and a rear end defining a housing portion and a lock receiving portion,
   wherein the housing portion has, in an inner periphery thereof, an internal thread and a taper portion which is located adjacent the internal thread toward the front end of the main pipe joint;
   a pipe connected to the main pipe joint via the housing portion;
   a radial auxiliary pipe joint, connectable to the pipe and the main pipe joint, having
      an external thread which is screwed in a locking direction into the internal thread of the housing portion,
      a plurality of protrusions which protrude radially from the auxiliary pipe joint, wherein each of the plurality of protrusions has a pair of planar portions which are formed perpendicular to a center axis of the auxiliary pipe joint on opposite sides of each of the plurality of protrusions, and hexagonal holes are formed in each of the plurality of protrusions parallel to the center axis of the auxiliary pipe joint, and
      locking means for locking the main pipe joint and the auxiliary pipe joint via the lock receiving portion; and
   a flexible packing, located between the taper portion and the pipe, which forms a seal between the pipe and the main pipe joint,
   wherein the plurality of protrusions each define internally threaded bores therein which are parallel to the center axis of the auxiliary pipe joint, and the pipe joint structure further comprises a plurality of reinforced arms which are disposed perpendicular to the center axis of the auxiliary pipe joint, and support members which are connected to the plurality of reinforced arms and are supported by a floor through which the pipe passes, wherein the plurality of reinforced arms are attached to the auxiliary pipe joint via screws which are inserted into the plurality of reinforced arms and are screwed into the internally threaded bores.

8. An auxiliary pipe joint, comprising
   an external thread which is suitable for screwing into an internal thread of a pipe; and
   a plurality of protrusions which protrude radially from the auxiliary pipe joint, wherein each of the plurality of protrusions has a pair of planar portions which are formed perpendicular to a center axis of the auxiliary pipe joint on opposite sides of each of the plurality of protrusions, and each of the plurality of protrusions defines hexagonal holes and an internally threaded bore therein through which a locking bolt may be screwed, wherein the hexagonal holes and the internally threaded bore are formed parallel to the center axis of the auxiliary pipe joint.

9. The auxiliary pipe joint of claim 8, wherein the auxiliary pipe joint comprises two half-shapes, each comprising a joining surface, wherein the two half-shapes are attached via an attachment portion which is formed on each joining surface.

10. A pipe joint, comprising
    a main pipe joint having a front end and a rear end defining a housing portion suitable for receiving a pipe, and a lock receiving portion,
    wherein the housing portion has, in an inner periphery thereof, an internal thread and a taper portion which is located adjacent the internal thread toward the front end of the main pipe joint;
    a radial auxiliary pipe joint, connectable to the pipe and the main pipe joint, having
       an external thread which is screwed in a locking direction into the internal thread of the housing portion,
       a plurality of protrusions which protrude radially from the auxiliary pipe joint, wherein each of the plurality of protrusions has a pair of planar portions which are formed perpendicular to a center axis of the auxiliary pipe joint on opposite sides of each of the plurality of protrusions, and hexagonal holes are formed in each of the plurality of protrusions parallel to the center axis of the auxiliary pipe joint, and
       locking means for locking the main pipe joint and the auxiliary pipe joint via the lock receiving portion; and a flexible packing, located between the taper portion and the pipe, which forms a seal between the pipe and the main pipe joint in use.

11. An auxiliary pipe joint, having a front end and a rear end, and comprising an external thread, provided toward the front end, which is suitable for screwing into an internal thread of a pipe;

a plurality of protrusions which protrude radially from the auxiliary pipe joint, wherein each of the plurality of protrusions has a pair of planar portions which are formed perpendicular to a center axis of the auxiliary pipe joint on opposite sides of each of the plurality of protrusions, and each of the plurality of protrusions defines an internally threaded bore therein which is parallel to the center axis of the auxiliary pipe joint;

a locking bolt which is screwed into each internally threaded bore; and a radial stepped portion, formed at the rear end, comprising a small-diameter portion, which is formed toward the plurality of protrusions, adjacent a large-diameter portion.

* * * * *